Nov. 30, 1965 L. DEL LUCCHESE 3,220,404

COMBINED X-RAY AND PHONOCARDIOGRAPHIC CAMERA

Filed Feb. 19, 1963

INVENTOR:
LUCIANO DEL LUCCHESE
By
E. M. Squire
ATTY.

3,220,404
Patented Nov. 30, 1965

3,220,404

COMBINED X-RAY AND PHONOCARDIOGRAPHIC CAMERA

Luciano Del Lucchese, Via Donnini 52, Livorno, Italy

Filed Feb. 19, 1963, Ser. No. 259,662
Claim priority, application Italy, Feb. 28, 1962, 4,369/62
3 Claims. (Cl. 128—2.05)

The present invention relates to apparatus for simultaneously photographing a chest X-ray from a fluoroscopic screen and an electrocardiographic oscillogram of at least one heart cycle from the screen of a cathode ray tube.

Means are provided for automatically initiating the trace on the cathode ray tube when the voltage from the heart beat microphone exceeds a predetermined minimum threshold value, the horizontal component of the cardiographic trace being derived from a capacitor discharge circuit.

A camera with the usual strip film magazine which includes manually operable means for feeding successive frames, is arranged to photograph the active area of a vertical fluoroscopic X-ray screen on which a chest X-ray is formed. Simultaneously, the image of the electrocardiogram trace on the cathode ray tube is formed on the same frame of the film at a position below the chest X-ray. The name or other identification of the patient appears at the bottom of the photographic frame.

The invention is described in greater detail in the following specification with reference to the accompanying drawing forming a part hereof.

Figures 1, 2, 3, 4:
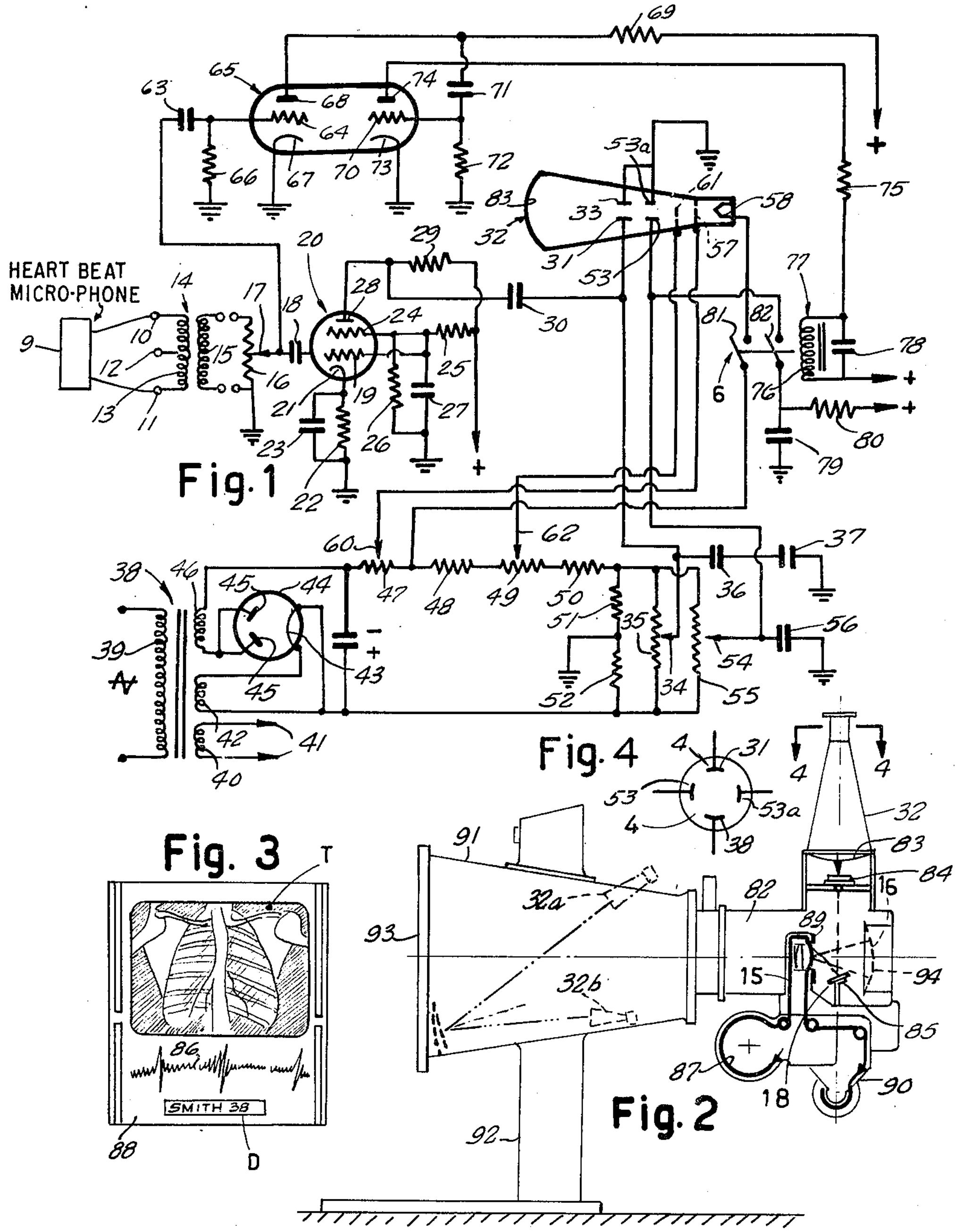
FIGURE 1 is a circuit diagram of the cathode ray oscilloscope portion of the apparatus.
FIGURE 2 is a diagrammatic view in side elevation of apparatus embodying the invention.
FIGURE 3 shows a photograph obtained by use of the apparatus of FIG. 2.
FIGURE 4 is an enlarged diagrammatic transverse sectional view taken on the line 4—4 of FIG. 2 showing the arrangement of the deflecting electrodes in the cathode ray tube.

Referring to FIG. 1, a heart beat microphone 9 is connected to input terminals 10 and 11. A center tap 12 terminal may be grounded for balanced input circuit operation if desired. The terminals 10, 11 and 12 are connected to the primary winding 13 of an input transformer designated generally as 14. The input transformer 14 is designed to operate as a filter which rejects disturbing frequencies. The transformer 14 is provided with a secondary winding 15 which is connected to an input gain control potentiometer 16. The movable contact 17 of potentiometer 16 is connected through a coupling capacitor 18 to the control grid 19 of a tetrode amplifier tube 20. The cathode 21 of tetrode 20 is grounded through a biasing resistor 22 shunted by a bypass capacitor 23. The screen grid 24 is maintained at an appropriate potential by connection to a voltage divider formed by serially connected resistors 25 and 26, the resistor 25 being connected to a suitable source of positive potential designated + and the resistor 26 being grounded. The resistor 26 is shunted by a bypass capacitor 27. The anode 28 of tetrode 20 is energized from the source + through a coupling resistor 29.

The anode 28 is connected through a coupling capacitor 30 to one of the vertical deflection electrodes 31 of a cathode ray tube designated generally as 32. The other vertical deflection electrode 33 is grounded. The electrode 31 is biased by connection to the movable contact 34 of an adjustable potentiometer 35 which, in turn, is connected across a voltage divider of a power supply, later to be described. Serially connected capacitors 36 and 37 provide a ground connection to electrode 31 which attenuates currents of undesired high frequencies.

The power supply comprises a transformer 38 having a primary winding 39 for connection to the usual commercial alternating current supply. The transformer 38 is provided with a secondary winding 40 which is connected to the heaters for the cathodes of various tubes as indicated in simplified form by the two arrow-heads 41. The transformer 38 has a further secondary winding 42 which is connected to the filament or heated cathode 43 of a rectifier tube 44. The rectifier tube 44 is provided with two anodes 45 which are connected in parallel for half-wave operation. The anodes 45 are connected to one end of a high voltage secondary winding 46 of transformer 38. The other terminal of the high voltage winding 46 is connected to the cathode 44 through a series circuit comprising a potentiometer 47, a resistor 48, a further potentiometer 49, a resistor 50 and a voltage divider formed by serially connected resistors 51 and 52, the junction between resistors 51 and 52 being grounded. The potentiometer 35 described above is connected across the voltage divider 51, 52.

One of the horizontal deflection electrodes 53 of the cathode ray tube 32 is biased by connection to the movable contact 54 of a potentiometer 55 the cooperating electrode 53*a* being grounded. The potentiometer 55 is connected across the voltage divider 51, 52 along with potentiometer 35. Undesired currents of high frequency are attenuated by a grounded bypass capacitor 56 connected to the deflection electrode 53.

The control grid 57 of cathode ray tube 32 is adjustably biased negatively with respect to the cathode 58 by connection to the movable contact 60 of potentiometer 47. The electrode 61 is adjustably biased positively with respect to the cathode 58 by connection to the movable contact 62 of potentiometer 49.

A connection extends from the movable contact 17 of input potentiometer 16 through a coupling capacitor 63 to one of the control grids 64 of a twin triode 65. The grid 64 is biased at ground potential through a resistor 66 and the cathode 67 is connected directly to ground. The anode 68 is connected to a suitable source of positive potential + through a coupling resistor 69. The anode 68 is connected to the other control grid 70 of twin triode 65 through a coupling capacitor 71. The control grid 70 is biased at ground potential through a resistor 72, its associated cathode 73 being directly grounded. The twin triode 65 is thus connected to operate as a two-stage resistance coupled amplifier-detector.

The output anode 74 is connected through a resistor 75 and the operating winding 76 of a two pole relay 77 to the source of positive potential designated +. The winding 76 is shunted by a capacitor 78.

A timing or horizontal sweep capacitor 79 is maintained charged through a resistor 80 from a suitable source of positive potential +. Operation of relay 77 closes one of its normally open poles 81 to energize the cathode 58 of the cathode ray tube 32 and render the tube operative. Simultaneously therewith, the other normally open pole 82 is closed and the charged timing or sweep capacitor 79 is connected to the horizontal deflection electrode 53. The capacitor discharges through the electrode 53 through operating a portion of its voltage range which is selected to sweep the ray of tube 32 across its screen 83 at substantially uniform velocity and at a rate which will produce an oscillogram of at least one and preferably two complete cardiographic cycles. This sweep is initiated when the signal at the grid 64 of twin triode 65 exceeds a minimum predetermined amplitude sufficient to cause operation of relay 77. This occurs during the course of a heartbeat and the voltage on capacitor 79 may be selected to drive the ray off the screen and hold it off the screen until just before the next cycle or heartbeat commences.

The cathode ray tube 32 is mounted on camera housing 82 with its screen 83 facing downwardly. An optical system comprising a lens 84 and a mirror 85 focuses an image of the oscillographic trace 86 (FIG. 3) on screen 83 on a portion of a strip of film 87 of which a frame 88 is placed within a window 89 of a film magazine 90 suitably mounted in the lower portion of the camera housing 82. The camera housing 82 is mounted at the rear of a fluoroscopic viewing housing 91. The viewing housing 91 is mounted at the top of an upright pedestal 92. There is a fluoroscopic screen 93 fixed to the front of the housing 91. An image of the X-ray shadow of the chest of a patient which is formed on the screen 93 is focused by a mirror 94 on a portion of the frame 88 of film 87 together with the image of the oscillographic trace 86. After each exposure of a particular frame of the film 87, the film is advanced in the usual manner to bring a new frame into position in the window 89. During the simultaneous formation of the X-ray and oscillographic images, the film 87 remains stationary.

Means (not illustrated) are provided for placing the usual identification indicia on the frame 88 within the area D so that the photograph may be associated with the particular patient for which the information in the photograph is relevant. The identification area D is located below the oscillogram 86 at D and the chest X-ray picture at T.

While I have shown and described what I believe to be the best embodiments of my invention, it will be apparent to those skilled in the art that various changes and modifications may be made therein without departing from the spirit and scope of the invention as defined in the appended claims.

I claim:

1. Photographic apparatus of the class described, comprising: a fluorescent screen for forming a fluoroscopic X-ray shadow of a patient; camera means for producing an image of said shadow on a photographic film; a cathode ray tube having a further fluorescent screen and horizontal and vertical deflection plates; optical means for producing an image on said film of the trace on said further screen, said trace image being spaced from said shadow image and formed simultaneously therewith; timing means connected to apply a uniformly changing voltage to said horizontal deflection plates; amplifier means having an input for connection to a microphone positioned for response to the heart sounds of said patient and an output connected to said vertical deflection plates; and control means connected for response to said microphone, said control means acting on said timing means for initiating a trace horizontally sweeping said screen in response to a signal exceeding a predetermined minimum amplitude delivered by said microphone means, said uniformly changing voltage varying at a rate causing at least one complete cardiographic cycle to be included in said trace and photographed on said film along with said shadow.

2. Apparatus according to claim 1, further comprising filter means operatively associated with said amplifier means for excluding extraneous noises from the output of said amplifier means.

3. Apparatus according to claim 1, wherein said timing means comprises a capacitor, and means for charging and discharging said capacitor to obtain said uniformly varying voltage; and in which said control means comprises further amplifier means connected for response to said mircrophone and a relay having an operating winding connected for energization by said further amplifying means, said relay including contacts which close when said signal exceeding said minimum amplitude is delivered by said microphone means, said contacts simultaneously energizing said cathode ray tube and applying said changing voltage to said horizontal deflection plates.

References Cited by the Examiner

UNITED STATES PATENTS

| | | | |
|---|---|---|---|
| 2,712,975 | 7/1955 | Golseth et al. | 128—2.06 X |
| 2,927,573 | 3/1960 | Roepke | 128—2.05 |
| 2,932,549 | 4/1960 | Kling et al. | 128—2.06 X |
| 2,944,542 | 7/1960 | Barnett | 128—2.05 |
| 3,052,756 | 9/1962 | Seven | 128—2.05 X |

RICHARD A. GAUDET, *Primary Examiner.*

L. R. PRINCE, SIMON BRODER, *Examiners.*